April 22, 1930.  M. CASSÉ  1,755,349

LATHE MECHANISM FOR OVAL TURNINGS

Filed Dec. 24, 1928   4 Sheets-Sheet 1

INVENTOR
Marcel Cassé
by [signature]
ATTORNEY

April 22, 1930.  M. CASSÉ  1,755,349
LATHE MECHANISM FOR OVAL TURNINGS
Filed Dec. 24, 1928  4 Sheets-Sheet 2

INVENTOR
Marcel Cassé
by
ATTORNEY

April 22, 1930.   M. CASSÉ   1,755,349
LATHE MECHANISM FOR OVAL TURNINGS
Filed Dec. 24, 1928    4 Sheets-Sheet 4

INVENTOR
Marcel Cassé
by
ATTORNEY

Patented Apr. 22, 1930

1,755,349

UNITED STATES PATENT OFFICE

MARCEL CASSÉ, OF ESSONNES, SEINE-ET-OISE, FRANCE

LATHE MECHANISM FOR OVAL TURNINGS

Application filed December 24, 1928, Serial No. 328,233, and in France January 5, 1928.

The present invention relates to a mechanism for oval turning lathes which may be embodied in machines for different industries, and in particular, for hat manufacture.

The invention has for its object to provide a lathe mechanism, which is so designed that all points of an oval piece can be brought into contact with a tool, while the tangent to the oval at the point of contact with the tool will have a constant direction, and the relative speed of the piece of work and tool will follow a determined law. This affords a much better trimming of the work than was heretofore possible with the known lathes.

The lathe mechanism for oval turning according to the invention is chiefly characterized by the fact that it comprises a frame or other rigid member in which is journalled the work-carrying spindle, two points of said frame being guided respectively according to a circular or other path, and according to a practically straight line, so that the said frame fill be given a reciprocating motion, whose general direction passes through the mean position of the said spindle and through the tool, as well as a periodic oscillation about the point having the straight path, these movements being so timed with respect to the movement of rotation of said spindle that their period will be twice the period of rotation of said spindle.

According to a particular embodiment of the invention, three spindles are journalled in the said frame. The first spindle carries the oval piece to be trimmed. The second spindle or shaft is operatively connected with the first by a suitable driving gear (such as gear or chain wheels, or the like), in such manner as to be rotated at twice the speed of the former and in the same direction, this second shaft forming part of a suitable mechanism (eccentric, crank or the like) by which it is caused to describe a circle or other path. The third shaft or pin is guided in a guide or by a relatively long link, or the like, in such manner as to move upon a practically straight path; finally, the tool is disposed on a straight line coinciding with the mean position of the straight line connecting the first-mentioned spindle with the third shaft or pin.

Obviously, the tool may be held stationary and the work-carrying spindle is thus moved in the space; alternatively, the spindle of the lathe may be stationary and the tool may be secured to the above-mentioned mechanism, the relative motion remaining the same.

Suitable devices may be combined with the above mechanism, in order to readily modify even when in operation the eccentricity of the crank means, the form of the oval, the law of the motion, and other factors.

The various features of the invention will be specified in the following description, with reference to the accompanying drawings, in which.

Figures 1, 3:
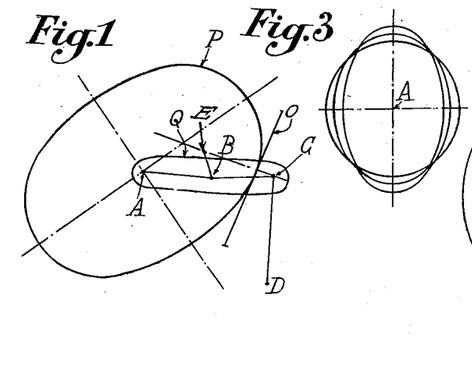
Fig. 1 is a diagrammatic view showing the principle of the mechanism according to the invention.
Fig. 3 shows the different oval forms which may be obtained with the same mechanism by adjusting the eccentricity.

In the form of construction which is shown diagrammatically in Figure 1, the oval piece of work P is secured to a spindle A which is rotatable in a frame Q or like rigid member having any desired form. A shaft B is rotatable in said frame Q and is operatively connected with spindle A by suitable gears, in such manner as to rotate at twice the speed of spindle A and in the same direction. The said gear may consist of a chain, cooperating with two sprocket wheels keyed to shafts A and B, respectively or by three external gear wheels, or by a pinion engaging an internally toothed annulus or by like means. Furthermore, shaft B is caused to move upon a given path, such as a circle, and for example, it may form the crank-pin of a crank lever whose driving shaft E is rotatably mounted in the stationary frame of the lathe. The length of the crank B E is equal to one-half the difference between the half-diameters of the oval. A pin C mounted in frame Q is caused to move on a straight or practically straight path which passes through the mean position of spindle A and through shaft E. Said pin C may be rotatably mounted in a slide movable in a straight guiding member, or it may be pivoted to the end of a link C D which is adapted to pivot about a stationary pin D and has a comparatively great length, such that the arc described by pin C does not materially differ from its chord. The tool O is disposed upon the straight line E C representing the path of pin C.

The angular setting of the oval piece upon spindle A is such that crank E B will have a triple action. It causes spindle A to recede from the tool when the front or end portions of the oval piece come opposite the tool, and it brings said spindle nearer the tool when the side portions of the oval piece come opposite the tool. It causes the frame A B C to pivot or oscillate about pin C in such manner that the oval piece will be at all times practically tangent to the line perpendicular at O to the straight line E—C—O. Finally, when the mechanism is driven from shaft E, the proportions and arrangement of the mechanism may be such that the motion of the point of the oval which engages the tool will follow a given law of speed, as will be hereinafter explained.

Figure 2:
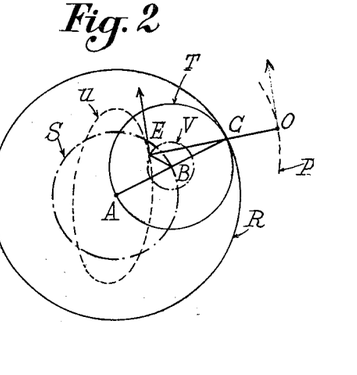
Fig. 2 is a diagram relating to a more specific arrangement.

Fig. 2 shows a particular construction of the device, according to the invention, in which the axes A—B—C are placed in line, with B at the middle of distance A C, the path of C being a stationary straight line E C passing through the mean positions of A and B, that is, when points A B E are in alignment. The tool has the position at point O upon this line. In that simple case, a geometric definition may be readily given of the curve described by the tool at point O (supposed movable) upon a rotating plane surface secured to spindle A (supposed stationary).

For an observer located on and driven by this movable plane, point C describes a circle R whose radius is A C, and point B describes a circle S whose radius A B is one-half the length A C. The construction is such that shafts A and B are operatively connected with one another, and that shaft B rotates in frame Q at twice the speed of spindle A, and in the same direction. For instance, a pinion whose centre is B and whose radius is A B, engages an internally toothed annulus whose centre is A and whose radius is A C. Due to this speed ratio, circle T rolls without slipping within circle R. Any point of this circle T, and for example point E, will describe an ellipse U (this being a particular case of the generation of hypocycloids).

The centre of instantaneous rotation of circle T rolling on circle R is the point of contact C. The straight line C E is thus normal to the basic ellipse U, at the point E. The length E O is constant. The path of point O pertaining to line E C is thus a curve P which is deduced from the basic ellipse U, in the following manner: At each point of the ellipse, a constant distance E O is carried on the corresponding normal; this curve P is thus parallel with the ellipse U. Since at any instant, the centre of rotation of the straight line E C O is C, the line E C O will be the normal to this curve P at each of its points. For a stationary observer, the curve formed by the tool O upon a movable plane rotated with spindle A will thus be a parallel of a basic ellipse. (This ellipse could be traced by point O if it would coincide with E.) The normal to this curve at the point O is a fixed straight line E C O. The tangent to this curve at point O will thus constantly coincide with the line perpendicular to E C O at O.

By displacing the tool O on the straight line C E, there is obtained a set of curves which are parallel with one another and with the basic ellipse U.

It is evident that the mechanism can be actuated starting from any one of the shafts or spindles A—B—C—D—E, and the motion will always be transmitted between the shafts A and B in the ratio 1 to 2, in the same direction.

If the drive is effected at constant speed from the shaft E, the motion is transmitted from said shaft E to shaft B, and thence to spindle A by suitable pinions. The pinion whose centre is B will then act as an eccentric pinion. If the driving gear, the various proportions and the spacing between the shaft centres are suitably calculated to oblige the piece of work P, which remains constantly in contact with and tangent to the tool at point O, may further be caused to rotate at a nonuniform rate, for example with a slowing up when the sides of the work are in contact with the tool, while increasing the speed when the ends come into contact with the tool, or vice-versa, this speed variation being proportional to the eccentricity B E.

The form of the resulting curves will evidently depend upon the proportions of the parts of the mechanism. As an example, if the radius A B of the eccentric pinion (real or imaginary) is near ¼ the difference between the major and minor axes, the basic ellipse is very flat and the curve P, parallel with the ellipse, is an oval which has a greater curvature than the ellipse at the ends of the major axis of the latter, so that it is very similar to the forms used in hat manufacture, these being ovals which are more rounded at the temples than an ellipse having the same vertices.

If the basic ellipse were reduced to a straight line, a theoretical case which could not be readily realized on account of the jamming action in the practical embodiment of the mechanism, its parallel curve would consist of two semicircles joined by two straight lines.

What ever may be the radius A B, the resulting curves have four vertices, the same centre and the same difference between the major and minor axes as the fundamental ellipse U. If the tool O is placed very near point E, these curves will be very near an ellipse having the same vertices. In all cases, the tool will remain tangent to the curves.

This mechanism may be readily designed in such manner that the vertices and the sides of the oval curves will move before the tool with a determined law of speed, this law depending upon the radius of the eccentric pinion (real or imaginary) whose centre is B and radius B A. The law of speeds may be such that the linear speed at which the sides of the piece of work move before the tool will be equal to the linear speed at which the vertices of the said piece are moved in front of the tool, that is, the oval will move before the tool at a practically constant speed. If shaft B carries a pinion engaging an internally toothed annulus whose centre is A and which is eccentric with reference to shaft E, and if it is assumed that the latter is the driving shaft, rotating at a constant angular speed, the constant linear speed of the oval can be obtained by giving to the eccentric pinion whose axis is B a radius equal to one-third the half-sum of the half-axes of the oval. For the same oval and for smaller values of the radius of the pinion whose axis is B, the linear speed of the sides is less than the speed of the vertices, and vice-versa.

Obviously, the frame A may be held stationary, that is, the shafts A and B may be mounted in stationary bearings and the point E will now represent the crank pin of an eccentric whose centre is B. The straight line C E will now carry the tool, which is now movable therewith. As before, the point C may be movable in a guide, or it can be guided by a long link C D.

Ovals of regular shape, which are symmetrical with reference to both their axes, or ovals which have an egg shape and have a greater curvature at the temples than the ellipse or the curves parallel thereto, (as obtained by the fundamental mechanism) may also be turned with my mechanism which then comprises the additional following features;

Starting from an oval lathe according to the invention, I attach thereto suitable means for varying the eccentricity of the axis B, during the rotation of the lathe, for instance the means which will be further described with reference to Figure 7.

All other factors remaining equal, if this eccentricity is increased from zero to the maximum in a stepwise manner, at each cycle of the rotation, I produce a series or family of oval curves of which the first is a circle (Fig. 3). The vertices of every oval are, internally and externally, at the same distance from this circle. If the eccentricity is now varied in a continuous manner and periodically, at the same frequency as that of the rotation of the shaft, in such manner that this eccentricity is a minimum when the vertex of the oval is in contact with the tool, and a minimum when the side is in contact with the tool, the tool will pass successively from a point of one oval to the next oval of the aforesaid family, from the roundest ovals to the most elongated ovals.

The oval thus defined by the tool will obviously depend upon the law of this periodic variation. This variation may be controlled by a variable eccentric or a cam rotating at the same speed as the shaft E, or even by the variable eccentric above-mentioned whose radius is B E, and herein both variations will be synchronous. The deformations given to the oval by this periodic variation are symmetrical with reference to the two axes, and the oval will remain regular.

However, if it is desired to obtain an oval shape which is asymmetrical with reference to one of the axes (the minor axis) while remaining asymmetrical with reference to the other (the major axis) that is, an egg-shaped oval, the periodic variation of the eccentricity is given a frequency which is one-half the preceding, the phase relation of this variation being such that the maximum eccentricity of B E corresponds to the contact of a vertex on the major axis with the tool.

By superposing these two periodic variations, it is feasible to obtain ovals which are more or less rounded at the temples.

The mechanisms above described may be employed in the construction of different machines, and for instance, in hat manufacture, they may be embodied in lathes for turning oval forms or moulds, of wood or metal, for pouncing and like treatments of crowns and rims, rounding, trimming, paring machines, machines for pasting the edge, edge-trimming, lathes for hat ironing, for smoothing, for velveting, for beaver surface, for satin finish, etc., and, in general, all machines operating upon oval pieces.

Figure 4:
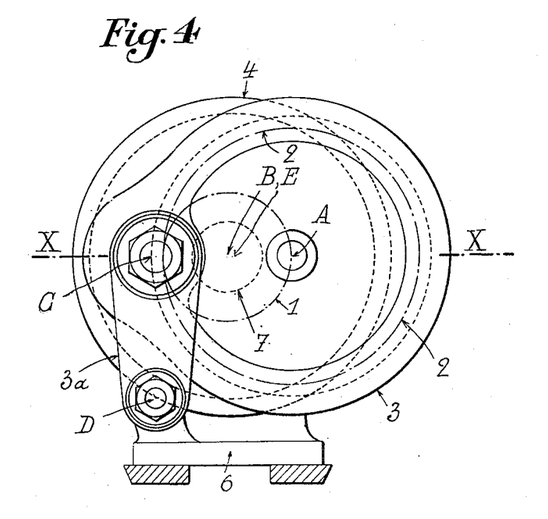
Fig. 4 is an elevational view showing an embodiment of the mechanism according to the invention as applied to the head-stock of a lathe.
Figures 5, 8, 10:
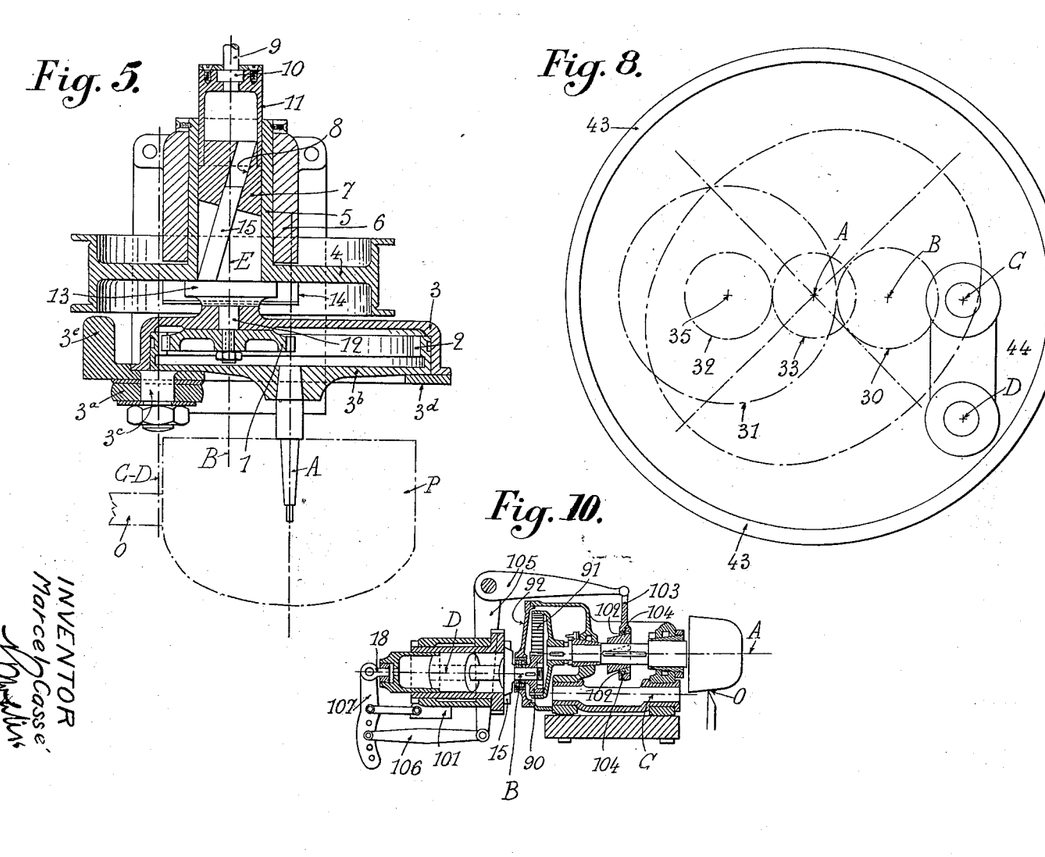
Fig. 5 is a horizontal section on the line X—X of Fig. 4, showing the said mechanism provided with a device for adjusting the eccentricity when in operation.
Fig. 8 is a diagrammatic end view.
Fig. 10 is a plan view of the same head stock, but comprising a modified attachment for obtaining the same result.

Figs. 4 and 5 show by way of example a constructional form of a mechanism according to the diagrammatic view of Fig. 1, as embodied in the headstock of a lathe, this mechanism also comprising a device for varying the eccentricity during the rotation.

In this example, 6 denotes a stationary frame adapted to support the stationary shafts D and E, as before. Shaft D is constituted by a small pin mounted on frame 6, while the shaft E is constituted by a sleeve 5 which is journalled in frame 6. Herein, the mechanism receives its motion from shaft E, and, for this purpose, sleeve 5 carries a driving pulley 4.

The moving frame Q is herein represented by a circular concave member or casing 3, in which is rotatably mounted a second concave member or dish $3^b$ carrying a shaft or spindle A upon which the piece of work is to be mounted. Casing 3 has secured thereto a ring $3^d$ having an enlarged heavy portion $3^e$ for balancing purposes.

The axis C is represented by a pivot pin $3^c$ which is held by ring $3^d$ and casing $3$—$3^b$.

It is connected to the pivot pin D by a link $3^a$ whose length is such that the path of pin $3^c$ (that is axis C of Fig. 1) does not materially differ from a straight line. The third axis B of the frame is represented by a pivot pin or shaft 12 which is journalled in the casing 3 and is connected to sleeve 5 (axis E) by an adjustable eccentric or crank of the following construction. A shoe 13 forming the body of the crank is guided between two guides 14 of the driving pulley 4 and at one side is secured pivot pin 12 and on the other side an oblique projection or tail, 15, movable in an oblique bore 8, formed in a cylindrical member 7, which is slidable in sleeve 5. By adjusting said block within socket 5, projection 15 will slide in bore 8, and is thus moved towards and away from the axis of sleeve 5 (axis E), thus adjusting the eccentricity of shoe 13 and pivot pin 12, (that is axis B of Fig. 1). In Figs. 4 and 5, the eccentricity has a zero value, and the axes B and E thus coincide.

Block 7 may be operated by a rod 9 whose shoulder 10 is rotatably connected with the end of a piston 11, secured to block 7. Shaft 12 (axis B) is operatively connected with spindle A by means of a pinion 1 keyed on pivot pin 12 and in gear engagement with an internally toothed annulus 2 cut in dish-shaped member $3^b$. The diameter of pinion 1 is equal to the radius of annulus 2.

The stationary tool O is disposed on the line X—X (Fig. 4) in contact with the piece of work P, on spindle A.

It will be seen that this mechanism comprises all the elements shown diagrammatically in Fig. 1.

The operation is as follows:

Pulley 4, which is driven by a belt or other transmission gear, rotates (through the medium of guides 14 and shoe 13) shaft 12 and pinion 1, which engages annulus 2, thus rotating spindle A in the same direction and at half the speed of pinion 1. Due to the eccentricity of pivot pin 12 with reference to sleeve 5 (axis E), said pivot pin will rotate about axis E, thus rotating casing 3 and spindle A, which, while rotating, will move the piece of work towards and away from tool O, in such manner that the oval piece remains in constant contact with the tool. At the same time, casing 3 is guided by pin $3^c$ in such manner as to oscillate and to place the piece of work always tangentially to the tool O.

Figure 6:
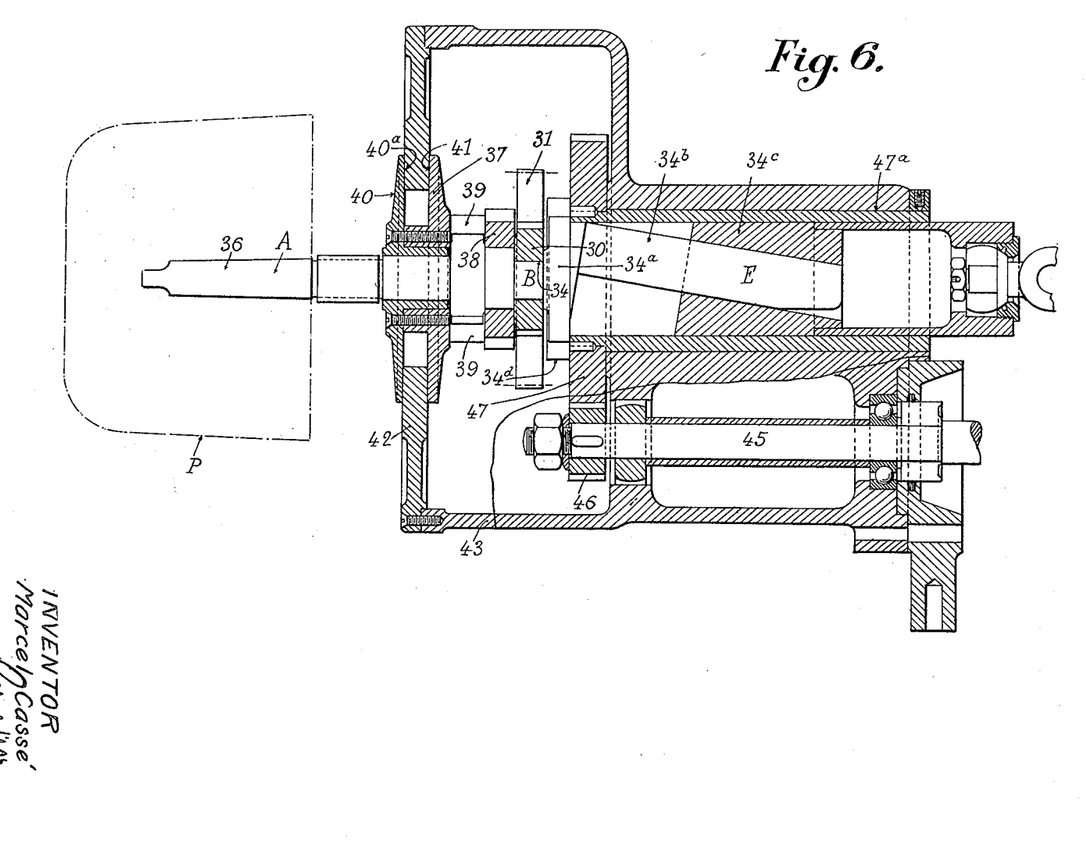
Fig. 6 is a vertical section of Fig. 9 on the line Y—Y—Y'—Y' at the upper part, and on the line Y—Y—Z at the lower part, showing a modified form of the mechanism shown in Figs. 4 and 5.
Figures 7, 9:
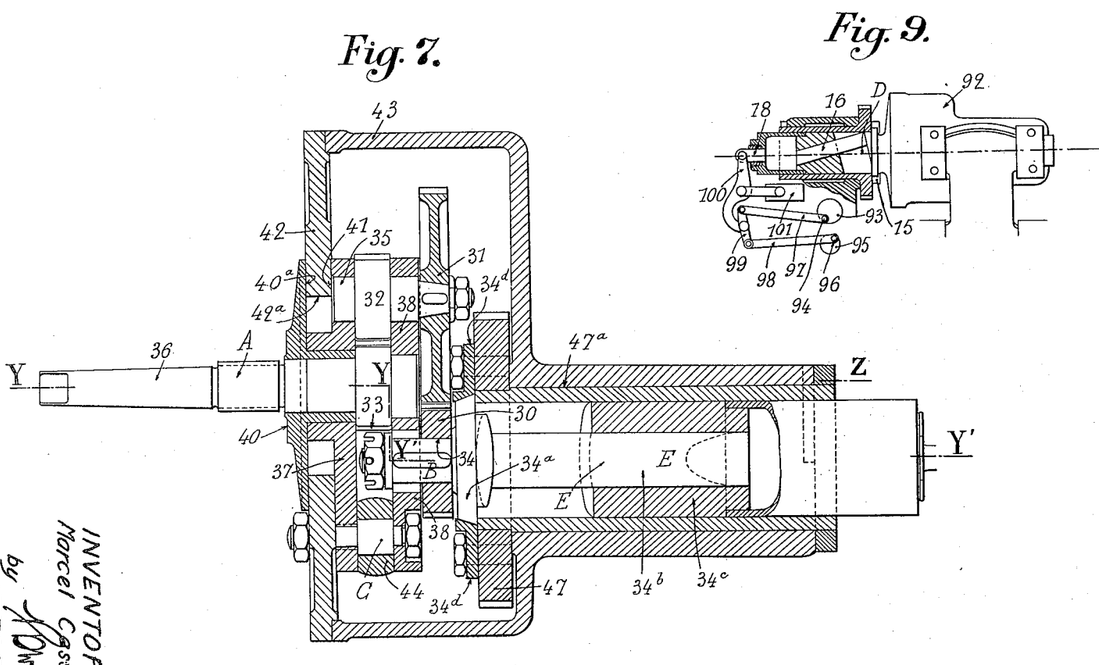
Fig. 7 is an horizontal section of Fig. 6 through the spindles A—B—C.
Fig. 9 shows on a smaller scale and in elevational sectional view the head stock for oval turning lathe, shown in Fig. 5, provided with an attachment, whereby oval pieces, either regular or of egg shape, and which are more or less rounded at the temples, may be trimmed on said lathe.

Figs. 6, 7 and 8 show a modification of the apparatus represented in Figs. 4 and 5, in which shafts A and B are operatively connected by means of external gears.

43 is a stationary frame or casing for the mechanism, which is closed at the front part by an end plate 42. In the said plate is an aperture $42^a$ which is traversed by a spindle 36 (spindle A of Fig. 1) carrying the piece of work P. To the said spindle 36, is keyed a pinion 33, held between two disks 37—38 which are spaced apart by the spacing members 39. The end-plate 42 is held between the flat face 41 of disk 37 and the flat face $40^a$ of a disk 40; disk 37 and disk 40 are freely slidable on the end-plate 42. The structure consisting of disks 37—38 and disk 40 constitutes the frame Q of Fig. 1. The pin C is mounted between the disks 37 and 38, and is connected by a link 44 (Fig. 8) to a pin D mounted in the casing.

As in the device shown in Figs. 6 and 7, shaft B consists of a crank-pin 34, mounted on a shoe $34^a$ carrying a projection or tail $34^b$, slidable in an oblique bore of a block $34^c$, adapted for axial displacement in a sleeve $47^a$. Shoe $34^a$ is guided by suitable guides $34^d$, secured to a gear wheel 47, mounted at the end of sleeve $47^a$, which is journalled in the casing 43 and whose axis corresponds to the axis E of Fig. 1.

The motion from shaft B is transmitted to spindle A by means of spur gear wheels 30—31—32—33; wheel 30 is keyed to the eccentric pin 34, and wheels 31—32 to an intermediate shaft or countershaft 35, the wheel 33 being keyed to spindle 36, as above stated. The gear ratio of the set of gearing, from wheel 30, through wheels 31—32, to wheel 33, is 2 : 1. The position of the intermediate shaft 35 with respect to spindles A B C may obviously be different. It is supposed in the drawing that said shaft is situated next spindle A with respect to spindle B, but it may also be disposed next spindle C with respect to B.

The apparatus is driven by a shaft 45 to which is keyed a pinion 46, engaging a gear wheel 47 whose axis is E.

The disposition and angular setting of the wheels of the mechanism relatively to the axes of the oval piece P and to the eccentric pin 34 are such that the smallest radius of the eccentric pinion (relatively to the driving axis E rotated at a constant speed) will be in meshing engagement when the side of the oval piece is in contact with the tool, and the largest radius will be in meshing engagement when the vertex of the oval piece is in contact with the tool.

The angular speed of the oval piece will thus be less at the sides and greater at the ends. in a proportion which depends upon the dimensions of the mechanism and upon the eccentricity.

It is obvious that the amplitude of this speed variation will diminish with the eccentricity of the pinion, as well as the eccentricity of the oval, and will be annulled at the same time as the eccentricity.

The improved mechanisms, above described, may be constructed exclusively with rotary parts and gear wheels, and the slides and guides may be eliminated (except for the guide 34$^d$ which serves simply to change the eccentricity).

Other devices may obviously be employed for actuating the spindle A from the shaft B.

Figs. 9 and 10 show by way of example two devices by which the eccentricity can be periodically varied during the rotation of the lathe.

The mechanism herein comprises the shafts A and B, which are operatively connected together by a pinion 90 keyed to shaft B and an internally toothed annulus 91 of double the diameter, which is secured to spindle A, as shown in Fig. 5. A casing 92 connects the said shafts together, and constitutes the aforesaid frame Q.

Fig. 9 shows a first device adapted to afford one or two or both periodic variations of eccentricity of shaft B (respectively at the frequency of shaft B and at the frequency of spindle A). For this purpose, a shaft 93, rotating at the same speed as shaft B, drives a crank or the like 94. The length of crank 94 may be varied during the rotation of the lathe for instance by means of an inclined cylinder on shaft 93, similar to the oblique projection 15 of Fig. 5.

A second shaft 95 is rotated at the same speed as shaft A, that is, at half the speed of shaft 93, and it actuates a crank 96 or the like, similar to 94.

These two cranks are respectively connected by means of two links 97—98 to the ends of a differential lever 99, similar to the sliding link of slide box reversing gears for steam engines. Said lever is pivoted to the end of a second lever 100. The other end of lever 100 is connected to a push piece 18 of a mechanism adapted to change the eccentricity during the rotation of the lathe, which may be similar to that described with reference to Figure 5.

The displacement of a slide 101 which is slidable in the main frame, parallel with the shaft D, affords an adjustment of the mean position of push-piece 18 during its alternating motion.

In the construction shown in Figure 10, spindle A has keyed thereto an eccentered disk 102 and which, due to the movements of spindle A, shifts a link 103 by means of a spherical bearing 104, whose centre is situated upon the axis of spindle A. Said link is connected with push-piece 18 through the medium of a bell crank lever 105, a link 106 and a lever 107. A slide 101 affords, as before, the adjustment of the mean position of said push piece.

The first periodic variation is due to the transmission of the oscillating and reciprocating motions of casing 92 in which spindle A is rotatably mounted. The second periodic variation is imparted to link 103 by the eccentered disk 102, which is rotated by spindle A.

Obviously, the application of the devices hereinbefore described is by no means limited to hat-making machines. Similarly, it is evident that the hat or like piece of work may be held stationary, the tool being, in that case, secured to spindle A.

Having now described my invention what I claim as new and desire to secure by Letters Patent is:

1. A lathe mechanism for oval turning comprising in combination a first frame, three parallel spindles rotatably mounted in said frame, equally spaced from one another and arranged in a common plane, power transmission means for connecting the central spindle with another spindle whereby said central spindle is caused to rotate at a speed equal to twice the speed of said other spindle, in the same direction, means for mounting a working member on said other spindle, a second frame, means for imparting to said central spindle a circular motion relatively to said second frame, means for reciprocating the third spindle along a substantially rectilinear path relatively to said second frame, in the plane of the mean position of said three spindles, and a working member secured to said second frame in said common plane, one of said working members being the piece of work and the other being the tool, and one of said frames being stationary, the other frame being thus imparted a combined reciprocating and oscillating motion relatively to the former.

2. A lathe mechanism for oval turning comprising in combination a first frame, a spindle rotatably mounted in said frame, a working member on said spindle, a second frame, means for connecting said frames together and for guiding a first point of one frame along a curved trajectory relatively to the other frame, means for guiding a second point of said first frame along a substantially rectilinear path relatively to said second frame, means for displacing said connecting means whereby the relative motion of said first point with respect to said second frame has a frequency equal to twice the frequency of the rotation of said spindle, and has the same direction as the latter and a working member of fixed position relatively to said second frame and adapted to engage the working member on said spindle, one of said working members being the work and the other being the tool, and one of said frames being stationary, the other frame being thus imparted a reciprocating motion whose general direction passes substantially through said tool and the middle position of said spindle and at the same time, an oscillating motion about said second point.

3. A lathe mechanism for oval turning comprising in combination a first frame, a work carrying spindle rotatably mounted in said frame, a second frame, a tool secured to said second frame and adapted to engage the oval work on said spindle, means for connecting said frames with one another and for imparting to one frame a reciprocating motion relatively to the other, in a direction passing substantially through said tool, at a frequency equal to twice the frequency of the rotation of said spindle, and means for simultaneously oscillating said reciprocating frame relatively to the other at the frequency of said reciprocating motion, whereby the operative face of said tool constantly engages the work on said spindle and makes a constant angle with the tangent at the point of contact.

4. A lathe mechanism for oval turning comprising in combination an oscillating member, a work carrying spindle rotatably mounted in said member, a stationary frame, means for connecting said frame with said member and for guiding one point of the latter along a curved trajectory, means on said stationary frame for guiding a second point of said oscillating member along a substantially rectilinear path relatively to said frame, a tool of fixed position adapted to engage the work on said spindle, means for rotating said spindle and means for displacing said first point upon its trajectory at a frequency equal to twice the frequency of the rotation of said spindle, and in the same direction as the latter.

5. A lathe mechanism for oval turning comprising in combination a first frame, a work carrying spindle rotatably mounted in said frame, a second frame, crank means for connecting said frames together and for guiding a first point of one frame along a curved trajectory relatively to the other frame, means for guiding a second point of said first frame along a substantially rectilinear path relatively to said second frame, means for rotating said spindle, transmission means cooperating with said rotating means and said crank means for rotating the latter at a frequency equal to twice the frequency of the rotation of said spindle and in the same direction as the latter, and a tool of fixed position relatively to said second frame and adapted to engage the work on said spindle, one of said frames being stationary, and the other frame being thus imparted a reciprocating motion whose general direction passes substantially through said tool and the middle position of said spindle and, at the same time, an oscillating motion about said second point.

6. A lathe mechanism for oval turning comprising in combination a first frame, a work carrying spindle rotatably mounted in said frame, a second frame, means for connecting said frames together and for guiding a first point of one frame along a curved trajectory relatively to the other frame, a guiding member pivoted to said second frame and adapted to guide a second point of said first frame along a rectilinear path relatively to said second frame, means for displacing said connecting means whereby the relative motion of said first point with respect to said second frame has a frequency equal to twice the frequency of the rotation of said spindle, and has the same direction as the latter, and a tool of fixed position relatively to said second frame and adapted to engage the work on said spindle, one of said frames being stationary, and the other frame being thus imparted a reciprocating motion whose general direction passes substantially through said tool and the middle position of said spindle and at the same time an oscillating motion about said second point.

7. A lathe mechanism for oval turning comprising in combination a first frame, a work carrying spindle rotatably mounted in said frame, a second frame, crank means for connecting said frames together and for guiding a first point of one frame along a circular trajectory relatively to the other frame, means for guiding a second point of said first frame, aligned with the axis of said spindle and said first point and at the same distance from said first point as said spindle, along a substantially rectilinear path relatively to said second frame, means for rotating the crank pin of said crank means at a frequency equal to twice the frequency of the rotation of said spindle, and in the same direction as the latter and a tool of fixed position relatively to said second frame and adapted to engage the work on said spindle, one of said frames being stationary, and the other frame being thus imparted a reciprocating motion whose general direction passes substantially through said tool and the middle position of said spindle and at the same time an oscillating motion about said second point.

8. A lathe mechanism for oval turning comprising in combination a first frame, a work carrying spindle rotatably mounted in said frame, a second frame, one of said frames being stationary, crank means pivoted to said frames, means on said second frame for guiding a point of said first frame along a substantially rectilinear path relatively to said second frame, means for rotating said spindle, means for rotating said crank means at a frequency equal to twice the frequency of the rotation of said spindle, and in the same direction as the latter, a tool of fixed position relatively to said second frame and adapted to engage the work on said spindle, and means for adjusting the operative length of said crank, means between its pivoting points on said frames.

9. A lathe mechanism for oval turning comprising in combination an oscillating member, a work carrying spindle rotatably mounted in said oscillating member, a stationary frame, a tool of fixed position relatively to said frame and adapted to engage the work on said spindle, a rotary spindle rotatably mounted in said oscillating member, a driving shaft rotatably mounted in said frame, crank means for connecting said rotary spindle and said driving shaft, means for guiding a point of said oscillating member along a substantially rectilinear path relatively to said frame, power transmission means adapted to be actuated by said driving shaft for rotating said work carrying spindle, and said rotary spindle, the latter at a frequency equal to twice the frequency of the rotation of said work-carrying spindle, and power means for actuating said driving shaft, whereby the portions of smaller curvature of the work are moved with a slower speed in front of said tool than the portions of greater curvature.

10. In a lathe mechanism as claimed in claim 8, automatic means connected to said rotating means and to said adjusting means for periodically varying the operative length of said crank means at a frequency equal to the frequency of one of said rotating means.

11. A lathe mechanism for oval turning comprising in combination a casing, a work carrying spindle rotatably carried by said carrying spindle, a stationary frame, means for connecting said frame with said casing and for guiding one point of said casing along a curved trajectory, means on said frame for guiding a second point of said casing along a substantially rectilinear path relatively to said frame, means within said casing for rotating said spindle, and for displacing said first point upon its trajectory, the latter at a frequency equal to twice the frequency of the rotation of said spindle, and a tool of fixed position adapted to engage the work on said spindle.

12. A lathe mechanism for oval turning comprising in combination a circular casing, a toothed annulus rotatably guided within said casing, a work carrying spindle rigid with said annulus, a fixed frame, a driving shaft pivotally carried by said frame, an eccentered trunnion carried by said shaft and pivotally mounted in said casing, a gear wheel keyed to said trunnion and within said casing, said gear wheel having a diameter equal to half the diameter of said annulus and meshing therewith, means on said frame for guiding a point of said casing along a substantially rectilinear path, and a tool of fixed position adapted to engage the work on said spindle.

13. A lathe mechanism for oval turning comprising in combination a first frame, a work carrying spindle rotatably mounted in said frame, a second frame, a rotary hollow shaft pivotally carried by said second frame and having a radial guide, a slide member adapted to be guided in said guide and pivotally connected with said first frame, a sliding block slidably mounted in said hollow shaft and having oblique guiding means cooperating with an oblique guided portion of said slide member, means for adjusting the position of said sliding block in said hollow shaft, means for guiding a point of said first frame along a substantially rectilinear path relatively to said second frame, means connected with said rotary shaft for rotating said spindle at a frequency equal to half the frequency of the rotation of said hollow shaft, and a tool of fixed position relatively to said second frame and adapted to engage the work on said spindle, one of said frames being stationary, and the other frame being thus imparted a reciprocating motion whose general direction passes substantially through said tool and the middle position of said spindle, and at the same time an oscillating motion about said second point.

14. A lathe mechanism for oval turning comprising in combination a casing, a work carrying spindle rotatably mounted in said casing, a fixed frame, crank means pivoted to said frame and having a trunnion pivotally connected to and extending within said casing, a countershaft pivoted within said casing, a gear wheel keyed to said spindle, a gear wheel keyed to said trunnion, gear wheels on said countershaft and adapted to mesh with the above mentioned gear wheels, the gear ratio between said trunnion and said spindle being 2:1, means on said frame for guiding a point of said casing along a substantially rectilinear path, means for rotating said crank means and a tool of fixed position adapted to engage the work on said spindle.

15. A lathe mechanism according to claim 13, which further comprises a countershaft adapted to be driven from said hollow shaft, a rocking lever, means for connecting said rocking lever to said countershaft, so as to impart to the former an oscillating motion at the frequency of the rotation of said countershaft, and means for connecting said lever with said sliding block.

16. A lathe mechanism according to claim 13, which further comprises a countershaft adapted to be driven from said hollow shaft, a rocking lever, means for connecting said rocking lever to said countershaft so as to impart to the former an oscillating motion at the frequency of the rotation of said countershaft, means for connecting said lever with said sliding block and means for adjusting the position of the pivot axis of said rocking lever.

17. A lathe mechanism according to claim 13, which further comprises two countershafts adapted to be driven from said hollow shaft at frequencies respectively equal to the frequency of the rotation of said shaft and to half the said frequency, a rocking lever, means for connecting said rocking lever to said countershafts whereby the latter impart an oscillating motion to said rocking lever, and means for connecting said rocking lever with said sliding block.

In testimony whereof I have signed my name to this specification.

MARCEL CASSÉ.